(12) United States Patent
Tsuzuki (10) Patent No.: US 8,504,856 B2
(45) Date of Patent: Aug. 6, 2013

(54) COMMUNICATION APPARATUS WITH POWER SAVING

(75) Inventor: Ryosuke Tsuzuki, Anjo (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 283 days.

(21) Appl. No.: 13/020,699

(22) Filed: Feb. 3, 2011

(65) Prior Publication Data

US 2011/0191614 A1 Aug. 4, 2011

(30) Foreign Application Priority Data

Feb. 4, 2010 (JP) ................................. 2010-022700

(51) Int. Cl.
*G06F 1/32* (2006.01)

(52) U.S. Cl.
USPC .......................................... 713/323; 713/320

(58) Field of Classification Search
USPC .................................. 713/310, 320, 323, 324
See application file for complete search history.

(56) References Cited

U.S. PATENT DOCUMENTS

| | | | | |
|---|---|---|---|---|
| 5,440,690 A | * | 8/1995 | Rege et al. ................... | 709/250 |
| 8,001,404 B2 | * | 8/2011 | Pathak .......................... | 713/320 |
| 8,010,821 B2 | * | 8/2011 | Edwards et al. .............. | 713/324 |
| 2009/0313492 A1 | * | 12/2009 | Lerman ........................ | 713/323 |
| 2010/0023788 A1 | * | 1/2010 | Scott et al. ................... | 713/320 |
| 2011/0289334 A1 | * | 11/2011 | Bold et al. .................... | 713/323 |
| 2012/0102084 A1 | * | 4/2012 | Hiltunen et al. .............. | 709/201 |

FOREIGN PATENT DOCUMENTS

| | | |
|---|---|---|
| JP | 2001-282398 A | 10/2001 |
| JP | 2004-005029 A | 1/2004 |
| JP | 2005-313489 A | 11/2005 |

* cited by examiner

*Primary Examiner* — Glenn A Auve
(74) *Attorney, Agent, or Firm* — Baker Botts L.L.P.

(57) ABSTRACT

A communication apparatus that is to be connected to a network includes: a first processing unit configured to transition between a sleep state and a non-sleep state and configured to process a packet received via the network when the first processing unit is in the non-sleep state; and a second processing unit configured to process a packet when the first processing unit is in the sleep state, wherein the second processing unit is capable of executing packet-processing for sequentially processing of unprocessed packets, wherein the second processing unit includes a detecting section that detects a reception of the unprocessed packet, wherein, when the first processing unit is in the sleep state and the reception of the unprocessed packet is detected, the second processing unit starts the packet-processing, and wherein, the second processing unit terminates the packet-processing if a continuous packet-processing period exceeds an allowable time period.

9 Claims, 9 Drawing Sheets

| | MAIN CPU 14 | SUB CPU 24 | SRAM 20 | DRAM 22 | DISPLAY PANEL 38 |
|---|---|---|---|---|---|
| PROCESSING STATE | CLOCK SUPPLY | CLOCK SUPPLY | NORMAL OPERATION MODE | NORMAL OPERATION MODE | ON |
| STANDBY STATE | CLOCK SUPPLY | CLOCK SUPPLY | NORMAL OPERATION MODE | NORMAL OPERATION MODE | ON |
| L SLEEP STATE | CLOCK SUPPLY | CLOCK SUPPLY | NORMAL OPERATION MODE | NORMAL OPERATION MODE | OFF |
| D SLEEP STATE | CLOCK STOP | CLOCK SUPPLY | NORMAL OPERATION MODE | SELF REFRESH MODE | OFF |

COMMUNICATION APPARATUS WITH POWER SAVING

CROSS-REFERENCE TO RELATED APPLICATION

This application claims priority from Japanese Patent Application No. 2010-022700 filed on Feb. 4, 2010, the entire subject matter of which is incorporated herein by reference.

BACKGROUND

Technical Field

The present disclosure relates to a communication apparatus that is to be connected to a network.

A related art discloses an image forming system having a main CPU and a sub CPU. The mode of the image forming system transitions between an energy-saving mode having relatively low power consumption and a normal mode having relatively high power consumption. The power is supplied to the main CPU in the normal mode, but the power is not supplied to the main CPU in the energy-saving mode. Such an image forming system transitions into the energy-saving mode after a lapse of time from the completion of the last job performed by the main CPU, thereby achieving power saving of the image forming system. Each time data is received from external equipment during the energy-saving mode, the sub CPU changes an operation mode of the image forming system from the energy-saving mode to the normal operation mode, thereby supplying power to the main CPU.

There is a need for further power saving in a communication apparatus The present disclosure provides a communication apparatus that is capable of achieving further power saving.

SUMMARY

An aspect of the present invention relates to a communication apparatus that is to be connected to a network. The communication apparatus includes a first processing unit and second processing unit. The first processing unit transitions between a sleep mode and a non-sleep mode. When the first processing unit is in the non-sleep mode, the first processing unit processes a packet received via a network. When the first processing unit is in the sleep mode, the second processing unit processes the packet received via the network. The second processing unit is capable of executing packet-processing for sequentially processing one or more unprocessed packets. The second processing unit includes a detecting section that detects a reception of the unprocessed packet. When the first processing unit is in the sleep mode and the reception of the unprocessed packet is detected, the second processing unit starts processing the packet. If the continuous processing time period of the packet-processing exceeds the allowable time period, the second processing unit interrupts processing the packet even when an unprocessed packet still remains.

In the communication apparatus, when the first processing unit is in the sleep mode, the second processing unit is capable of processing the unprocessed packet. That is, when the first processing unit is in the sleep mode, there is no need for the first processing unit to frequently transition from the sleep mode to the non-sleep mode. As a result, since a period during which the first processing unit is maintained in the sleep mode may be prolonged, more power saving can be achieved in the communication apparatus. However, if the number of unprocessed packets is increased, the continuous processing period of packet-processing is prolonged. Thus, a problem arises in that the second processing unit cannot execute processes, other than (different processes) the packet-processing for an extended period. To deal with this problem, in the communication apparatus, if the continuous processing period of packet-processing exceeds the allowable processing period, the second processing unit stops processing the packet even when unprocessed packet still remains. Accordingly, the problem that the second processing unit cannot execute other processes for a long period can be solved.

Additionally, a control method and a computer program for achieving the communication apparatus according to aspects of the present invention may be useful and novel.

DETAILED DESCRIPTION

Figure 1:
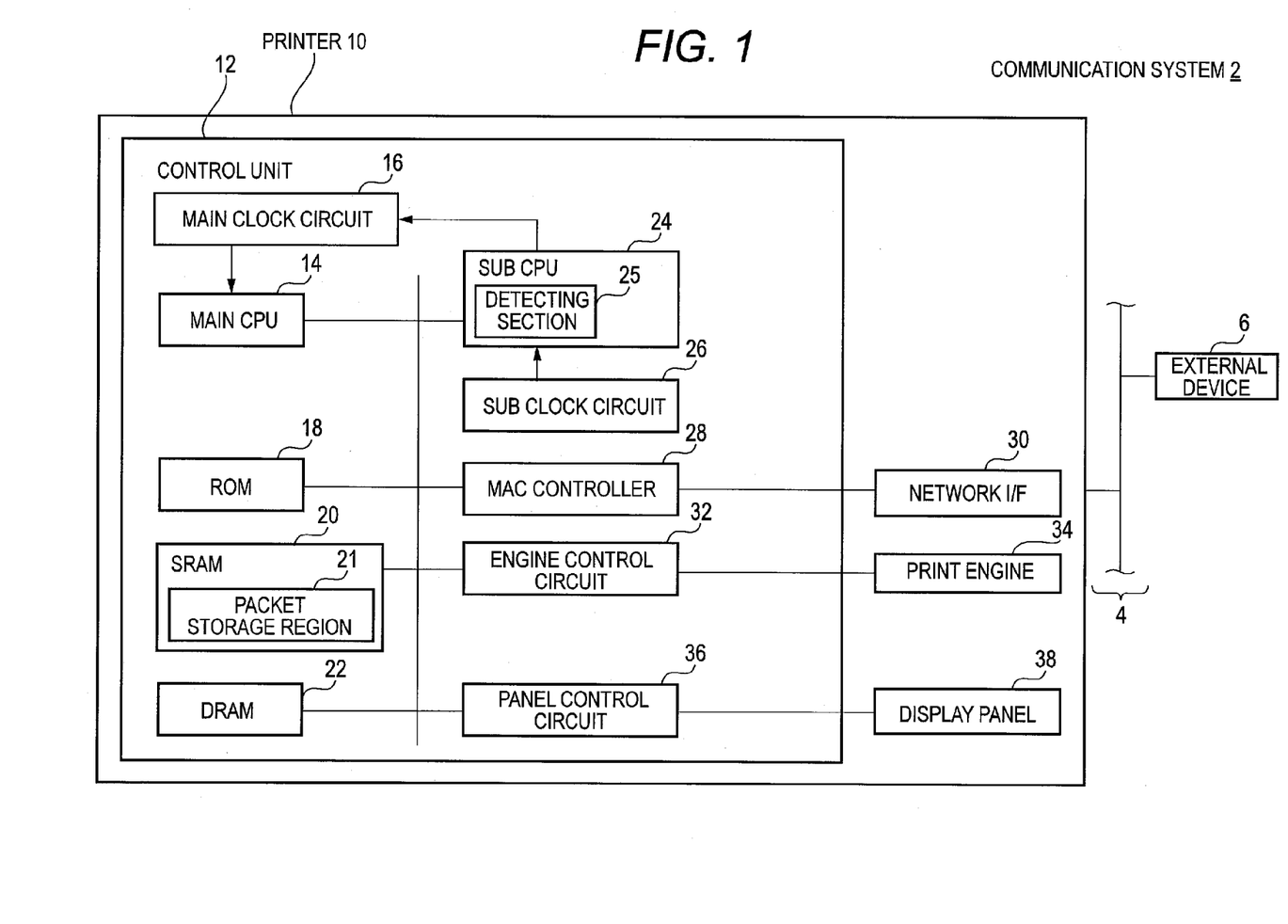
FIG. 1 is a view showing the configuration of a communication system.

Hereinafter, exemplary embodiments of the present invention will be described with reference to the accompanying drawings. FIG. 1 is a view showing the configuration of a communication system 2 according to one exemplary embodiment. The communication system includes an external device 6 and a printer 10. The external device 6 and the printer 10 are connected to a LAN 4 and communicate with each other.

(Configuration of the Printer)

As shown in FIG. 1, the printer includes a control unit 12, a network interface 30, a print engine 34, and a display panel 38. The control unit 12 includes a main CPU 14, a main clock circuit 16, a ROM 18, a DRAM 20, a SRAM 22, a sub CPU 24, a sub clock circuit 26, a MAC controller 28, an engine control circuit 32, and a panel control circuit 36.

The main CPU 14 executes a variety of processes according to programs stored in a DRAM 22. The main CPU 14 includes a timer unit. The main clock circuit 16 supplies a clock signal to the main CPU 14. When the clock signal is being supplied to the main CPU 14, the main CPU 14 is in a non-sleep state. When the clock signal is not supplied to the main CPU 14, the main CPU is in a sleep state. The main clock circuit 16 is controlled by the sub CPU 24. That is, when the main CPU 14 is in the sleep state, the main CPU has lower power consumption than the non-sleep state.

The sub CPU 24 executes a variety of processes according to programs stored in a SRAM 20. The sub CPU 24 includes a clock unit therein. The sub clock circuit 26 supplies a clock signal to the sub CPU 24. A frequency of the clock signal from the sub clock circuit is lower than that of the clock signal from the main clock circuit 16. Thus, compared to power consumption for driving the main CPU 14, the power consumption for driving the sub CPU 24 is low. Therefore, the processing speed of the main CPU 14 is faster than that of the sub CPU 24, and thus, the packet-processing time of the main CPU 14 is shorter than that of the sub CPU 24. The sub clock circuit 26 supplies a clock signal to the sub CPU 24 when the printer is turned ON, and the sub clock circuit stops supplying the clock signal to the sub CPU 24 when the printer is turned OFF. That is, the sub CPU 24 is maintained in the non-sleep state while the printer 10 is turning ON.

The ROM 18 stores a plurality of compressed programs, which are executed by the main CPU 14 and the sub CPU 24. When the printer 10 is turned ON, the respective programs are uncompressed in the SRAM 20 or the DRAM 22. The main CPU 14 or the sub CPU 24 executes a process using the programs uncompressed in the SRAM 20 or the DRAM 22. All the programs stored in the ROM 18 are first developed in the DRAM 22 when the printer 10 is turned ON. Subsequently, a predetermined program among the plurality of programs uncompressed in the DRAM 22 is loaded in the SRAM 20. Meanwhile, the control unit 12 also has circuits (not shown in the drawings), for supplying clock signals to the SRAM 20 and the DRAM 22, respectively.

The SRAM 20 is accessible from the main CPU 14 and the sub CPU 24. The SRAM 20 has a packet storage region 21. The packet storage region 21, as described later, stores the packet received via the LAN 4 when the DRAM 22 is not in the normal operation mode (D sleep state 48 described in FIGS. 2 and 3). The packet, which is received by printer 10 via the LAN 4 and is not processed yet, will be hereinafter referred to as an "unprocessed packet". Further, the unprocessed packet is classified into a packet that can be processed by either the main CPU 14 or the sub CPU 24 (hereinafter referred to as a "first unprocessed packet") and a packet that can be processed by only the main CPU 14 (hereinafter referred to as a "second unprocessed packet"). In this exemplary embodiment, the first unprocessed packet includes a packet such as ARP, NetBIOS-NS, ICMP, or the like, and the second unprocessed packet includes a printing instructing packet for executing printing by the printer 10. The SRAM 20 stores a program, which is executed by the sub CPU 24, for executing a process of FIG. 5. Further, the program includes a program for executing the processing (step S86 in FIG. 5) of the first unprocessed packet by the sub CPU 24 instead of the main CPU 14. The SRAM 20 also stores a program that the sub CPU 24 executes a specific process other than the processing of the first unprocessed packet. For example, the specific process may include a timer process in which the printer 10 periodically transmits a packet, which indicates the printer being able to perform communication (e.g. a KEEP ALIVE packet), to the LAN 4. When the printer 10 is turned ON, the main CPU 14 loads and stores a program for sub CPU 24, which has been previously determined by a vender or the like among the plurality of programs uncompressed in the DRAM 22, in the SRAM 20.

The SRAM 20 stores necessary information for executing the processing of the first unprocessed packet, the specific process, and etc., by the sub CPU 24, Examples of the necessary information may include an IP address, a MAC address, a node name, etc., of the printer 10. When the main CPU determines that it can be transitioned to a sleep state (step S34 in FIG. 4), the main CPU 14 stores the necessary information required for executing a process by the sub CPU 24 instead of the main CPU 14, in the SRAM 20

The SRAM 20 also stores a state parameter indicating the state of the printer 10. The printer 10 is operated in any one of a "processing state", a "stand-by state", a "light sleep state (L sleep state)", and a "deep sleep state (D sleep state)". Thus, one of four values corresponding to the four kinds of states is stored in the SRAM 20. Further, a state-transition flag used to transition the main CPU 14 from the sleep state to the non-sleep state is stored in the SRAM 20.

The sub CPU 24 cause states of the main CPU 14 to transition from the sleep state to the non-sleep state when the main CPU 14 is in the sleep state and the state-transition flag is in an ON state.

The DRAM 22 is accessible from the main CPU 14. The DRAM 22 has a total memory capacity higher than the SRAM 20. Accordingly, the power consumption of the DRAM 22 is higher than that of the SRAM 20. The DRAM 22 stores a network processing program for the processing unprocessed packet by the main CPU 14. The network processing program includes a program for executing the processing of the first unprocessed packet, a program for executing the processing (e.g. printing) of the second unprocessed packet (e.g. printing instructing packet), and the like. The network processing program also includes a program for controlling the MAC controller 28, a TCP/IP protocol stack for executing a process using a TCP/IP, a program for executing a process using a variety of application protocols, and the like. The DRAM 22 also stores a program for executing process of FIG. 4 by the main CPU 14. When the printer 10 is turned ON, the main CPU 14 uncompresses and stores the network processing program, which was stored in the ROM 18, in the DRAM 22. The DRAM 22 also stores the information required by the main CPU for executing processes. For example, an IP address, a MAC address, a node name, status information, and the like of the printer 10 are stored. When the information is changed, the main CPU 14 corrects the stored information.

The network interface 30 shown in FIG. 1 is connected to the LAN 4. The MAC controller 28 temporarily stores unprocessed packet, which are received via the LAN 4, in a buffer. The MAC controller 28 converts the unprocessed packet into a form that can be processed by the printer 10. The engine control circuit 332 controls a print engine 34 according to a command from the main CPU 14. The panel control circuit 36 controls a display panel 38 according to a command from the main CPU 14. The display panel 38 is an LCD. The panel control circuit 36 causes the display panel 38 to transition between an ON state and an OFF state. That is, the panel control circuit 36 causes the display panel 38 to transition into the ON state by applying voltage to the display panel 38 and to transition into the OFF state by stopping the applied voltage to the display panel 38.

(Transition of Printer State)

Figure 2:
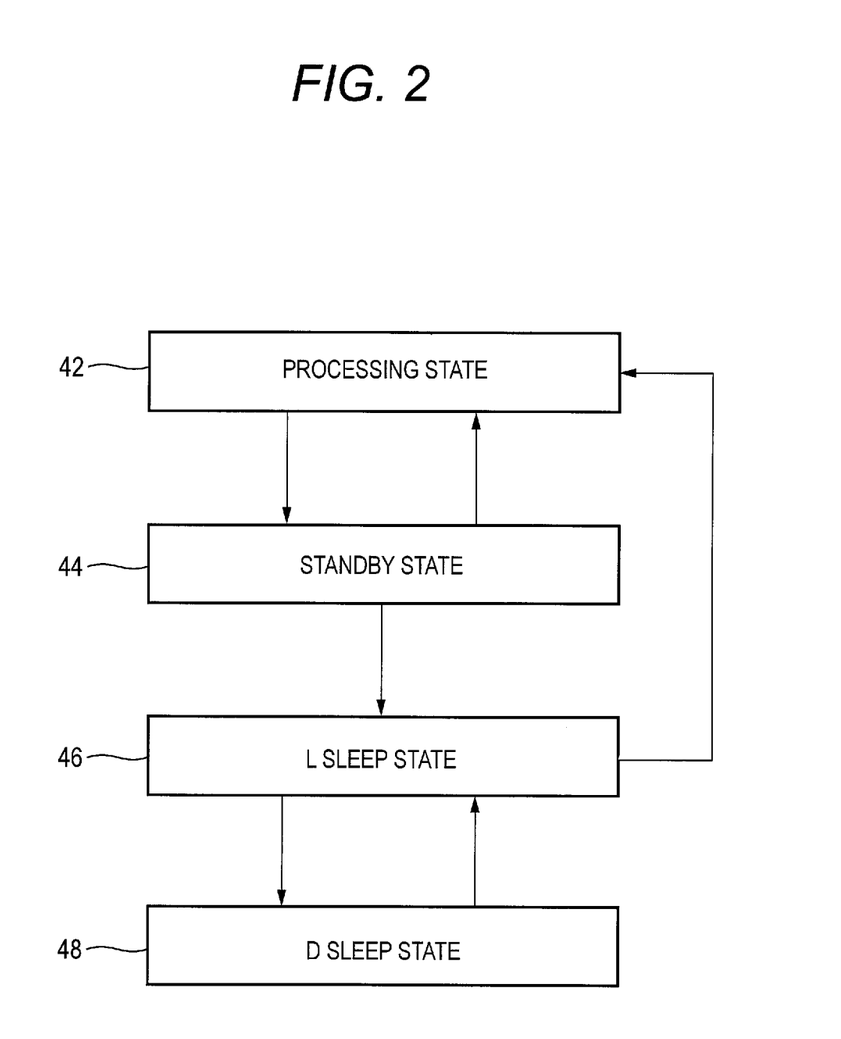
FIG. 2 is a view showing an example of state transitions in the printer.
Figure 3:
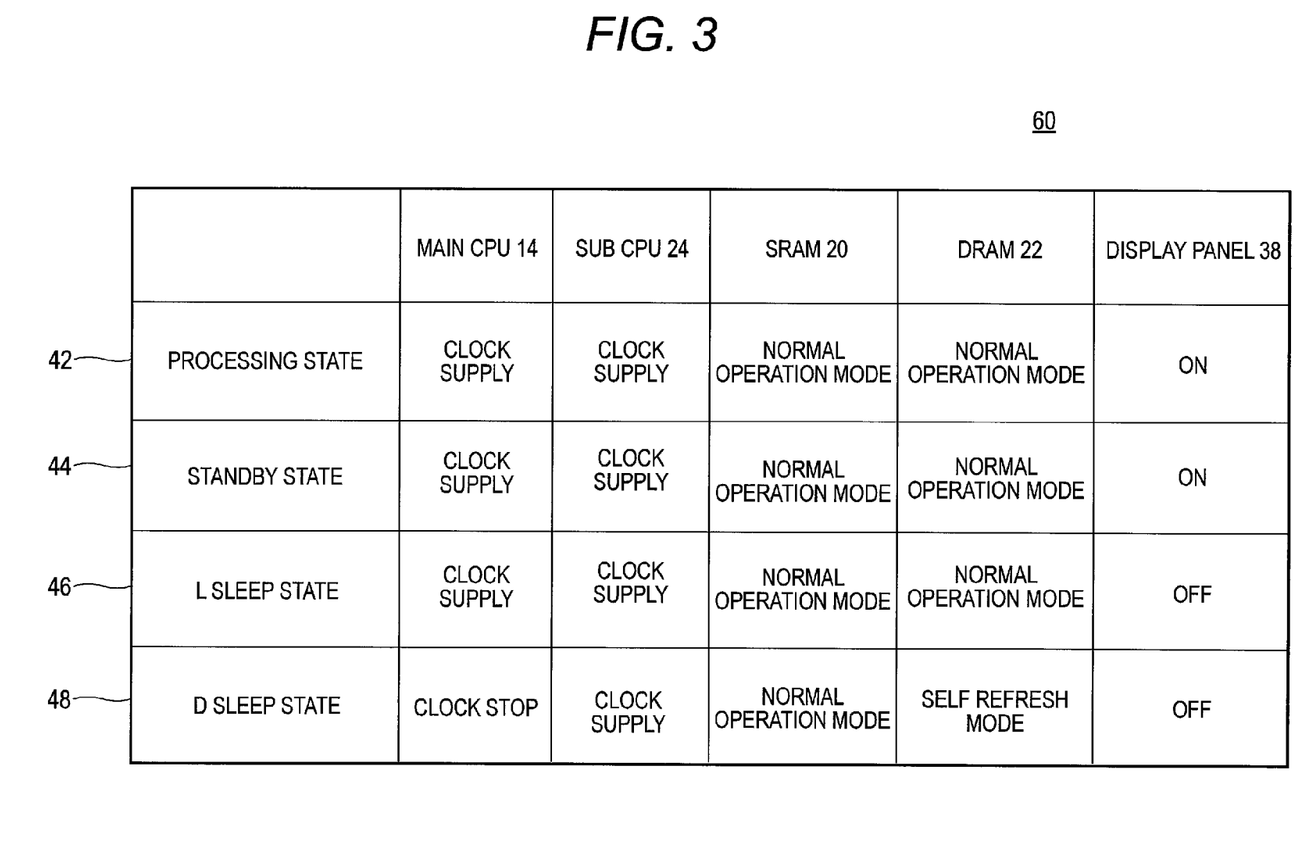
FIG. 3 is a view showing an example of the states of the respective units according to the states of the printer.

As shown in FIG. 2, the states of the printer 10 transitions between the processing state 42, the stand-by state 44, the L sleep state 46, and the D sleep state 48. A table 60 in FIG. 3 shows the states of the main CPU 14, the sub CPU 24, the two RAMs 20 and 22, and the display panel 38 when the printer 10 is in the respective states 42, 44, 46, and 48. When the printer 10 is turned ON, the printer 10 comes into the stand-by state 44. As shown in FIG. 3, in the stand-by state 44, clocks are supplied to the two CPUs 14 and 24 (that is, the two CPUs 14 and 24 are in the non-sleep state). The two RAMs 20 and 22 are in the normal operation mode, and the display panel 38 is in the ON state.

When the printer 10 is in the stand-by state 44 and has to execute a normal process, the printer 10 transitions into the processing state 42. Meanwhile, the normal process includes a print process executed according to the printing packet, a display process executed when the display panel 38 is manipulated by a user, or the like. Like in the stand-by state 44, in the processing state 42, the two CPUs 14 and 24 are in the non-sleep state, the two RAMs 20 and 22 are in the normal operation modes, and the display panel 38 is in the ON state. A difference between the processing state 42 and the stand-by state 44 is whether or not the main CPU 14 executes the normal process. If the main CPU 14 completes the normal process, the printer 10 transitions into the stand-by state 44.

When the printer transitions into the stand-by state 44, the main CPU 14 starts operating the timer unit provided therein. When the stand-by state 44 continues for a certain period, the main CPU 14 instructs the panel control circuit 36 to turn the display panel 38 into the OFF state. As a result, the printer 10 transitions into the L sleep state 46. In the L sleep state 46, the two CPUs are in the non-sleep state, the two RAMs are in the normal operation mode, and the display panel 38 is in the OFF state. Accordingly, power consumption of the display panel 38 can be reduced. In the L sleep state 46, when the main CPU 14 has to execute the normal process (the print process, the display process, or the like), the printer 10 transitions into the processing state 42.

Figure 4:
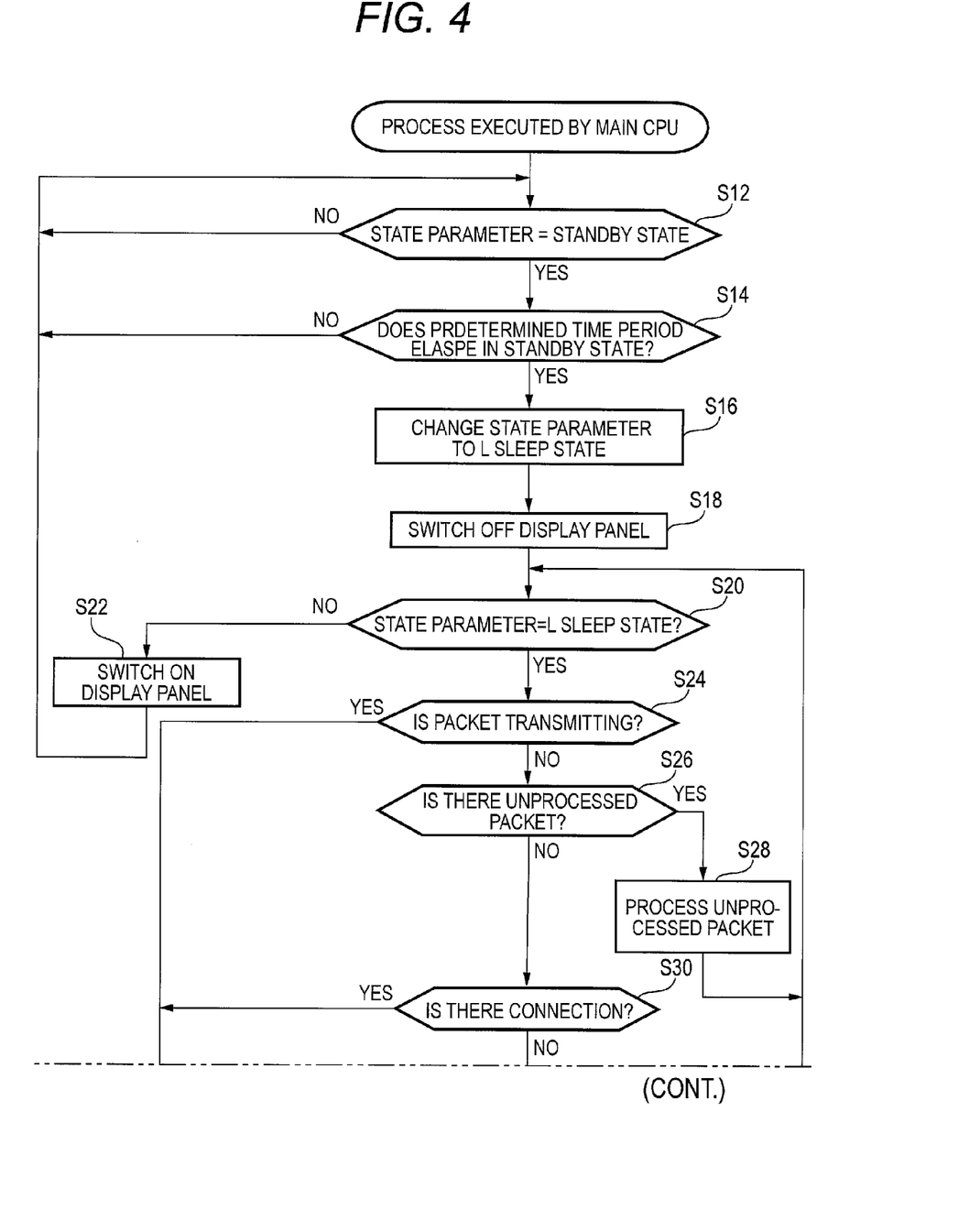
FIG. 4 is a view showing a flow chart of a power-saving process executed by a main CPU.

The printer 10 changes from the L sleep state 46 to the D sleep state 48 by the processing of the process of FIG. 4 by the main CPU 14. In the D sleep state 48, the main CPU 14 is in the sleep state (the state in which a clock signal is not supplied), the sub CPU 24 is in the non-sleep state, the SRAM 20 is in the normal operation mode, the DRAM 22 is in a self-refresh mode (i.e. the mode of power consumption is lower than the normal operation mode), and the display panel 38 is in the OFF state. In the D sleep state 48, when the main CPU 14 has to execute the normal process (the print process, the display process, or the like), the printer 10 transitions into the processing state 42 via the L sleep state 46. When the printer 10 changes from the D sleep state 48 to the L sleep state 46, the DRAM 22 changes from the self-refresh mode to the normal operation mode, and the main CPU 14 is also changed from the sleep state to the non-sleep state.

(Process Executed by the Main CPU)

The process executed by the main CPU 14 will be described. FIG. 4 is a view showing a flow chart of a power-saving process executed by a main CPU 14. The process of FIG. 4 is started, when the printer 10 is turned ON and the main CPU 14 resets the timer unit. When the printer 10 is turned ON, the printer 10 is in the stand-by state. The main CPU 14 stores a state parameter indicating the stand-by state 44 in the SRAM 20.

When the printer 10 is in the states 42 or 44, the DRAM 22 is in the normal operation mode, and unprocessed packet received via the LAN 4 are stored in the DRAM 22. The main CPU 14 processes the unprocessed packet stored in the DRAM 22. For example, when the printer 10 is in the stand-by state 44 and the main CPU 14 has to process the first unprocessed packet, the printer 10 remains in the stand-by state 44 without transitioning to the processing state 42 (i.e. the state parameter is not changed). In this state, the main CPU 14 processes the first unprocessed packet. More specifically, the main CPU 14 executes the responding process to the first unprocessed packet. Further, when the printer 10 is in the stand-by state 44 and the main CPU 14 has to execute the normal process (the print process according to the second unprocessed packet (i.e. the printing instructing packet) or the display process), the printer 10 transitions into the processing state 42. When the printer 10 changes from the stand-by state 44 to the processing state 42, the main CPU 14 changes the state parameter (a value indicating the stand-by state 44) stored in the SRAM 20 to a value indicating the processing state 42. Meanwhile, when the main CPU 14 completes the normal process (print process or display process) and the printer 10 changes from the processing state 42 to the stand-by state 44, the main CPU 14 changes the state parameter (a value indicating the processing state 42) stored in the SRAM 20 to a value indicating the stand-by state 44.

The main CPU 14 determines whether or not the state parameter stored in the SRAM 20 is indicating the stand-by state 44 (step S12). If the main CPU determines as YES in step S12, the process proceeds to step S14, and if the main CPU determines as NO, the main CPU 14 repeats determining process in step S12. In step S14, the main CPU 14 determines whether or not the measuring time of the timer unit exceeds a certain period. Meanwhile, the timer unit is reset each time the printer 10 transitions into the stand-by state 44. If step S14 determines as NO, the process returns to step S12, and if S14 determines as YES, the process proceeds to step S16. In step S16, the main CPU 14 changes the state parameter (a value indicating the stand-by state 44) stored in the SRAM 20 to a value indicating the L sleep state 46. Subsequently, the main CPU 14 instructs the panel control circuit 36 to stop applying voltage to the display panel 38 (step S18). Accordingly, the display panel 38 comes into the OFF state. That is, the printer 10 becomes the L sleep state 46.

When the printer 10 is in the L sleep state 46, the DRAM is in the normal operation mode, and the unprocessed packet received via the LAN 4 is stored in the DRAM 22. When the printer 10 is in the L sleep state 46 and the main CPU 14 has to process the first unprocessed packet, the main CPU 14 processes the first unprocessed packet while the printer 10 is remaining in the L sleep state 46. Further, when the printer 10 is in the L sleep state and the main CPU 14 has to process the normal process, the printer 10 transitions into the processing state 42. In this case, the main CPU 14 changes the state parameter (a value indicating the L sleep state) stored in the SRAM 20 to a value indicating the processing state.

The main CPU 14 determines whether or not the state parameter stored in the SRAM 20 is indicating the L sleep state 46 (step S20). When the state parameter stored in the SRAM 20 is changed to a value indicating the processing state 42, the state is determined as NO in step S20 and the main CPU 14 instructs the panel control circuit 36 to apply voltage to the display panel 38 (step S22). Accordingly, the display panel 38 comes into an ON state. When the step S22 is completed, the process of the main CPU 14 returns to step S12. Meanwhile, in this case, the main CPU 14 determines that a determination in step S12 is NO until the normal process is completed.

Meanwhile, when a determination of step S20 is determined as YES, the main CPU 14 determines whether or not the packet is transmitted via the LAN 4 (step S24). For example, while the main CPU 14 is responding to the first unprocessed packet from the external device 6 or the like (e.g. responding to a request for status from the printer 10), step S24 is determined to be YES. If the process in step S24 is determined as YES, the process proceeds to step S32. Meanwhile, if the process in step S24 is determined as NO, the main CPU 14 determines whether or not the unprocessed packet is stored in the DRAM 22 (step S26). If the process in step S26 is determined as YES, the process proceeds to step S28, and if the process in step S26 is determined as NO, the process proceeds to step S30. In step S28, the main CPU 14 processes the unprocessed packet. The unprocessed packet processed in step S28 includes unprocessed packet that is received and stored in the DRAM 22 when the main CPU is in the non-sleep state, and a specific unprocessed packet that is received and stored in the SRAM 20 when the main CPU 14 is in the sleep state. Meanwhile, the specific unprocessed packet is moved to the DRAM 22 by the process of step S50 to be described later. For example, if the unprocessed packet processed in step S28 is the second unprocessed packet (i.e. the printing instructing packet), the main CPU 14 causes the printer 10 to transition into the processing state 42 and changes the state parameter stored in the SRAM 20 to a value indicating the processing state 42. In this case, the process in step S20 is determined as NO, the display panel comes into the ON state in step S22, and the process proceeds to step S12. Further, for example, when the unprocessed packet processed in step S28 is the first unprocessed packet, the main CPU 14 processes the unprocessed packet when the printer 10 maintains the L sleep state 46 (that is, without changing the state parameter). In this case, the process in step S20 is determined as YES.

In step S30, the main CPU 14 determines whether or not there is a device (e.g. external device 6) that is connected to the printer 10. For example, when the printer 10 has a function of a web server and the external device 6 is being TCP-connected to the web server of the printer 10, the process in step S30 is determined as YES. If the process in step S30 is determined as YES, the process proceeds to step S32, and if the process in step S30 is determined as NO, the process proceeds to step S34. In step S32, the main CPU 14 determines that the process cannot transition to the D sleep state 48, and the process proceeds to step S38. Meanwhile, in step S34, the main CPU 14 determines that the process can transition to the D sleep state 48, and the process proceeds to step S40. When the transmission of the packet (step S24) or the TCP connection is completed, the main CPU 14 executes WAIT command in step S38. When WAIT command is executed, the main CPU 14 comes into an execution-stand-by state that stands-by executing the process until an interruption request is received. Accordingly, the power consumption of the main CPU 14 can be reduced. In step S38, when receiving the interruption request, the main the process of CPU 14 returns to step S20.

In step S40, the main CPU 14 switches the RAM, which stores the unprocessed packet received via the LAN 4, from the DRAM 22 to the SRAM 20. Specifically, the main CPU 14 interrupts Direct Memory Access (DMA) transmitting to the DRAM 22. Accordingly, storing the unprocessed packet in the DRAM 22 is inhibited. Subsequently, the main CPU 14 comes into the state in which DMA transmitting to the SRAM 20 can be performed. Further, the main CPU 14 stores the necessary information (e.g. an IP address or the like of the printer 10) for executing a process by the sub CPU 24, instead of the main CPU 14. Then the main CPU 14 masks (inhibits) any interruption request sent from a unit other than the sub CPU 24 (step S42). The main CPU 14 changes the state parameter (a value indicating the L sleep state 46) stored in the SRAM 20 to a value indicating the D sleep state 48 (step S44). The main CPU 14 issues the interruption request to the sub CPU 24 in order to execute a process (step S46). The main CPU 14 executes WAIT command (step S48). When the WAIT command is executed, the main CPU 14 comes into an execution-stand-by state that stands-by executing the process until receiving the interruption request. When receiving the interruption request in step S48 (step See S102 in FIG. 5 to be described later), the process of the main CPU 14 proceeds to step S50. In step S50, the main CPU 14 moves the specific unprocessed packet (i.e. the unprocessed packet received during the D sleep state 48) stored in the packet storage region 21 of the SRAM 20 to the DRAM 22. Next, the main CPU 14 releases masking the interruption request to the sub CPU 24 (step S52), which was executed in step S34, and returns to step S20. That is, when receiving the interruption request, the main CPU 14 executes the process of step S20. In this case, the main CPU 14 determines that a determination of step S20 is YES.

(Process Executed by Sub CPU)

The process executed by the sub CPU will now be described. When the sub CPU is in the non-sleep state, the sub CPU 24 executes a timer process that sends a KEEP ALIVE packet to the LAN 4 with certain time intervals (hereinafter referred to as "timer-process executing intervals"). The process of FIG. 5 starts at a time when the printer 10 is turned ON. The sub CPU 24 executes a following process using a program stored in the SRAM 20. First, the sub CPU 24 executes WAIT command (step S62). The sub CPU 24 stands-by executing a process until receiving the interruption request (that is, the sub CPU 24 transitions to an execution-stand-by state). As described above, the main CPU 14 issues the interruption request to the sub CPU 24 in step S46 of FIG. 4. Consequently, the execution-stand-by state of the sub CPU 24 is released and the process proceeds to step S64.

Figure 5:
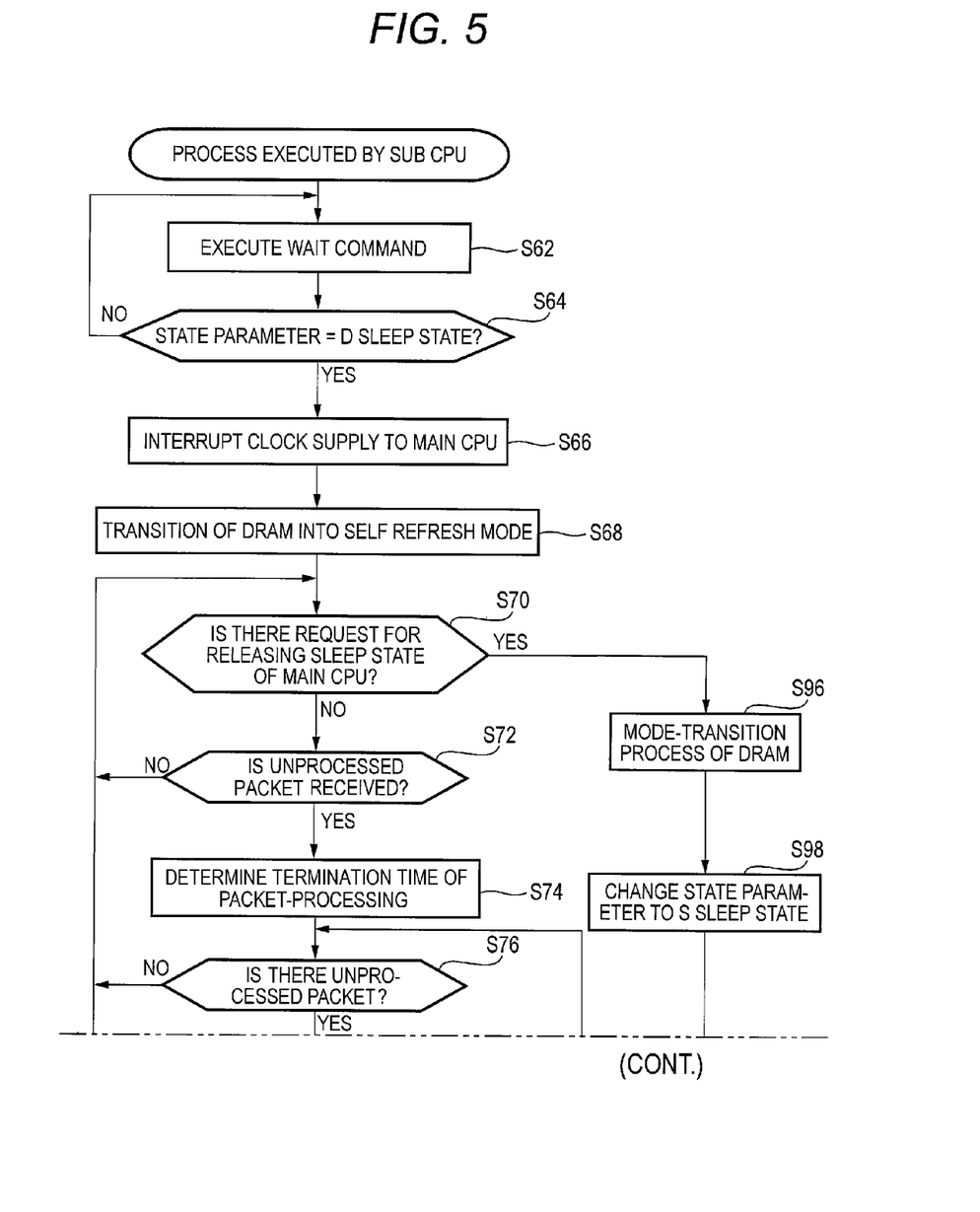
FIG. 5 is a view showing a flow chart of a power-saving process executed by a sub CPU.

In step S64, the sub CPU 24 determines whether or not the state parameter stored in the SRAM 20 indicates the D sleep state 48. If the process in step S64 is determined as NO, the process returns to step S62. That is, when the state parameter stored in the SRAM 20 indicates a value other than the D sleep state 48, the sub CPU 24 stands-by in the execution-stand-by state.

If the process in step S64 is determined as YES, the sub CPU 24 instructs the main clock circuit 16 (See FIG. 1) to interrupt supplying a clock signal (step S66). As a result, the main CPU 14 changes from the non-sleep state to the sleep state. Meanwhile, the sub CPU 24 switches the state-transition flag stored in the SRAM 20 into an OFF state. Subsequently, the sub CPU 24 changes the mode of the DRAM 22 from the normal operation mode to the self-refresh mode (step S68). When the DRAM 22 maintains the self-refresh mode, the unprocessed packet cannot be stored in the DRAM 22. Meanwhile, when the DRAM 22 is in the self-refresh mode, the power consumption of the DRAM 22 is lower than in the normal operation mode. Next, the sub CPU 24 determines whether or not there is a request for releasing the sleep state from the main CPU 14 (step S70). Specifically, when the state-transition flag stored in the SRAM 20 is in the ON state, the sub CPU 24 determines that a determination of step S70 is YES, and when the state-transition flag is in the OFF state, it determines that the determination of step S70 is NO. Meanwhile, the state-transition flag changes into an ON state in step S94, which will be described later. Further, when the operation of the display panel 38 is detected, the sub CPU 24 determines that the determination of step S70 is YES. If the process in step S70 is determined as YES, the process proceeds to step S96, and if the process in step S70 is determined to be NO, the process proceeds to step S72.

In step S72, the detecting section 25 of the sub CPU 24 executes a detecting process of receiving the unprocessed packet via the LAN 4. Specifically, the detecting section 25 determines whether or not the unprocessed packet has been stored in the buffer of the MAC controller 28. When the unprocessed packet has been stored in the buffer of the MAC controller 28, the detecting section 25 determines that a determination of the step S72 is YES, and the process proceeds to step S74. In this case, the sub CPU 24 moves the unprocessed packet stored in the buffer of the MAC controller 28 to the packet storage region 21 of the SRAM 20. Meanwhile, if the unprocessed packet has not been stored in the buffer of the MAC controller 28, the detecting section 25 determines that the determination of step S72 is NO, and the process returns to step S70. In step S74, the sub CPU 24 determines the termination time of the packet-processing for processing the unprocessed packet. Specifically, the sub CPU 24 determines the termination time of the packet-processing by adding the allowable time period, which has been previously stored in the SRAM 20, to current time indicated by the clock unit. Meanwhile, the allowable time period of the packet-processing is set to a period shorter than the timer process-executing interval.

Next, the sub CPU 24 executes the packet-processing. Meanwhile, when other unprocessed packet are received via the LAN 4 during the packet-processing, the sub CPU 24 stores sequentially the other unprocessed packet in the packet storage region 21. Further, the sub CPU 24 monitors the display panel to detect the operation of the display panel 38 (not shown in the drawings) during execution the packet-processing. When the operation of the display panel 38 is detected, the sub CPU 24 executes a process of step S94. Meanwhile, after terminating the packet-processing, which is being processed when the operation of the display panel 38 is detected, the sub CPU 24 executes the process of step S94. In the packet-processing, the sub CPU 24 processes sequentially the unprocessed packet stored in the packet storage region 21. That is, when the sub CPU 24 terminates the processing of the first unprocessed packet, but the current time is not yet past the termination time, the sub CPU 24 can process the second unprocessed packet after processing the first unprocessed packet.

The packet-processing includes processes of step S76 through step S94. In the packet-processing, the sub CPU 24 first determines whether or not the unprocessed packet remains in the packet storage region 21 (step S76). Here, if the determination is YES, the process proceeds to step S78, and if it is NO, the process returns to step S70. In step S78, the sub CPU 24 determines whether or not unused capacity of the packet storage region 21 is larger than a predetermined capacity. Here, if the determination is YES, the process proceeds to step S80, and if the determination is NO, the process proceeds to step S94. In step S80, the sub CPU 24 selects one of the unprocessed packet stored in the packet storage region 21. In this selecting process, the sub CPU 24 selects from the unprocessed packet stored in the packet storage region 21 in order of early-received unprocessed packet. Next, the sub CPU 24 determines whether or not the unprocessed packet selected in step S80 is a normal packet (step S82). For example, if the packet length described in a header of the unprocessed packet is not equal to actual packet length of the unprocessed packet, the sub CPU 24 determines that the unprocessed packet is not a normal packet. If the determination of step S82 is NO, the sub CPU 24 deletes the unprocessed packet (step S88) and proceeds to step S90.

Meanwhile, if the determination of step S82 is YES, the sub CPU 24 determines whether or not the unprocessed packet selected in step S80 is a type that is to be processed by the main CPU 14 (step S84). Specifically, the sub CPU 24 determines whether or not the unprocessed packet selected in step S80 is the second unprocessed packet (printing instructing packet). If the determination of step S84 is YES, the process proceeds to step S94, and if the determination of step S84 is NO, the process proceeds to step S86.

In step S86, the sub CPU 24 executes a responding process to the unprocessed packet selected in step S80 and proceeds to step S90. The responding process includes forming a responding packet to the unprocessed packet selected in step S80 and returning the responding packet to a transmission source of the unprocessed packet. In step S90, the sub CPU 24 determines whether or not current time indicated by the clock unit is past the termination time determined in step S74. Here, if the determination is YES, the process proceeds to step S92, and if the determination is NO, the process returns to step S76. In step S92, the sub CPU 24 determines whether or not the unprocessed packet still remain in the packet storage region 21. Here, if the determination is YES, the process proceeds to step S94, and if the determination is NO, the process returns to step S70. In step S94, the sub CPU 24 issues a release request to transition the state of the main CPU 14 from the sleep state to the non-sleep state. Specifically, the sub CPU 24 changes the state-transition flag of the main CPU 14, stored in the SRAM 20, from the OFF state to the ON state. When the process of step S94 is terminated, the process returns to step S70, and the sub CPU 24 determines that the determination of step S70 is YES.

If the determination of step S70 is YES, the sub CPU 24 executes a mode-transition process of the DRAM 22 (step S96). The mode-transition process includes a mode-transition process of transition of state of DRAM 22 from the self-refresh mode to the normal operation mode, and a memory-switching process of switching the RAM from the SRAM 20 to the DRAM 22. In the memory-switching process, the sub CPU 24 interrupts the DMA transmission to the SRAM 20. Accordingly, the SRAM 20 is inhibited from storing the unprocessed packet. As a result, the sub CPU 24 comes into a state that the DMA transmission to the DRAM 22 is capable.

Next, the sub CPU 24 changes the state parameter of the SRAM 20 indicating the D sleep state 48 to a value indicating the L sleep state 46 (step S98). Subsequently, the sub CPU 24 instructs the main clock circuit 16 (see FIG. 1) to start supplying a clock signal to the main CPU 14 (step S100). As a result, the main CPU 14 is supplied with the clock signal, and then the state changes from the sleep state to the non-sleep state. The sub CPU 24 issues an interruption request to the main CPU 14 (step S102). As a result, the main CPU 14 starts the process of step S50 shown in FIG. 4.

(Exemplary Embodiment of the Packet-Processing)

The exemplary embodiment of the packet-processing will be described with reference to FIG. 6. As shown in Case 1 of FIG. 6, when detecting the reception of the unprocessed packet P1 (when the determination of step S72 in FIG. 5 is YES), the sub CPU 24 determines a first termination time (step S74 in FIG. 5) and starts first packet-processing. The printer 10 receives the unprocessed packet P2 during processing of the unprocessed packet P1. The sub CPU 24 stores the unprocessed packet P2 in the packet storage region 21. When the processing for the unprocessed packet P1 is terminated, the sub CPU 24 determines whether or not the current time is past the first termination time (step S90 in FIG. 5), and if the determination is NO, the sub CPU 24 continuously executes the processing for the unprocessed packet P2. When the processing for the unprocessed packet P2 is terminated, the sub CPU 24 determines that the unprocessed packet does not remain in the packet storage region 21 (the determination of step S76 in FIG. 5 is NO) and terminates the first packet-processing. That is, the sub CPU 24 terminates the first packet-processing before the first termination time determined in step S74 in FIG. 5 elapses. After that, when the unprocessed packet P3 is received, the sub CPU 24 determines the second termination time (not shown) (step S74 in FIG. 5) and starts second packet-processing. In step S90 of the second packet-processing, it is determined whether or not the current time is past the second termination time. After the sub CPU 24 sequentially processes the unprocessed packets P4 to P6 received during the second packet-processing, the sub CPU 24 determines that the unprocessed packet does not remain in the packet storage region 21 (the determination of step S76 in FIG. 5 is NO) and terminates the second packet-processing. That is, the sub CPU 24 terminates the second packet-processing before the second termination time determined in step S74 in FIG. 5 has elapsed. Meanwhile, in a Case 1, since the first and second packet-processing events are terminated as a result of the determination of step S76 in FIG. 5 as NO, the process of step S94 in FIG. 5 is not executed. That is, in the Case 1, even when the packet-processing is terminated, the sub CPU 24 does not cause the state of the main CPU 14 to transition from the sleep state to the non-sleep state.

In a Case 2, when receiving the unprocessed packet P1, the sub CPU 24 starts the packet-processing. The sub CPU 24 processes sequentially the unprocessed packets P2 to P10 received during the packet-processing. In the Case 2, since the termination time determined in step S74 does not lapse (NO in step S90 of FIG. 5) after terminating the processing for the unprocessed packet P9, the sub CPU 24 processes the unprocessed packet P10. Since the termination time determined in step S74 elapsed (YES in step S90 of FIG. 5) after terminating the processing for the unprocessed packet P10, the sub CPU 24 terminates the packet-processing. Meanwhile, in the Case 2, the sub CPU 24 determines that the unprocessed packet does not remain in the packet storage region 21 when terminating the packet-processing (NO in step S92 of FIG. 5). Thus, since the process of step S94 of FIG. 5 is not executed, the sub CPU 24 does not cause the state of the main CPU 14 to transition from the sleep state to the non-sleep state.

In a Case 3, when receiving the unprocessed packet P1, the sub CPU 24 starts packet-processing and sequentially processes the unprocessed packets P2 to P10 similar to Case 2. After the processing for the unprocessed packet P10 (YES in step S90 of FIG. 5), the sub CPU 24 determines that the termination time determined in step S74 of FIG. 5 has elapsed. Accordingly, the sub CPU 24 terminates the packet-processing even when the unprocessed packets P11 to P14 still remain. The sub CPU 24 determines that the unprocessed packets P11 to P14 remain in the packet storage region 21 when terminating the packet-processing (YES in step S92 of FIG. 5). Thus, since the process of step S94 of FIG. 5 is executed, the sub CPU 24 causes the state of the main CPU 14 to transition from the sleep state to the non-sleep state (step S100 in case of YES in step S70). After the transition to the non-sleep state, the main CPU 14 moves the unprocessed packets P11 to P14 remaining in the packet storage region 21 to the DRAM 22 (step S50 in FIG. 4). Next, the main CPU 14 processes sequentially the unprocessed packets P11 to P14 (step S28 in FIG. 4).

In the Case 4, when receiving the unprocessed packet P1, the sub CPU 24 starts packet-processing in similar to the Case 2. The sub CPU 24 processes sequentially the unprocessed packets P2 to P4 received during the packet-processing. The sub CPU 24 determines that the unprocessed packet P5 is the second unprocessed packet that is to be processed by the main CPU 14 (YES in step S84 of FIG. 5), and, even when the unprocessed packets P5 and P6 still remain, terminates the packet-processing before the current time is past the termination time. In the forth case, since the determination of step S84 in FIG. 5 is YES, the process of step S94 is executed, the sub CPU 24 causes the state of the main CPU 14 to transition from the sleep state to the non-sleep state. After transitioning to the non-sleep state, the main CPU 14 moves the unprocessed packets P5 and P6 remaining in the packet storage region 21 to the DRAM 22 (step S50 in FIG. 4). Consequently, the main CPU 14 sequentially processes the unprocessed packets P5 and P6 (step S28 in FIG. 4).

In the Case 5, when receiving the unprocessed packet P1, the sub CPU 24 starts packet-processing, similar to the Case 2. The sub CPU 24 processes sequentially the unprocessed packets P2 to P4 received during the packet-processing. After terminating the processing for the unprocessed packet P4, the sub CPU 24 determines that the unused capacity of the packet storage region 21 is smaller than a predetermined capacity (NO in step S78 of FIG. 5). In this case, even when the unprocessed packets P5 to P15 still remain, the sub CPU 24 terminates the packet-processing before the current time is not past the termination time. In the Case 5, since the determination of step S78 in FIG. 5 is NO, the process of step S94 is executed, the sub CPU 24 causes the state of the main CPU 14 to transition from the sleep state to the non-sleep state. After transitioning to the non-sleep state, the main CPU 14 moves the unprocessed packets P5 to P15 remaining in the packet storage region 21 to the DRAM 22 (step S50 in FIG. 4) and sequentially processes the unprocessed packets P5 to P15 (step S28 in FIG. 4).

The exemplary embodiments have been described in detail. In the printer 10, the sub CPU 24 processes the unprocessed packets received via the LAN 4 when the main CPU 14 is in the sleep state. As a result, there is no need for frequent transition of the state of the main CPU 14 to the non-sleep state. Accordingly, since the time period during which the sleep state of the main CPU 14 is maintained is prolonged, the power-saving printer 10 can be achieved.

Figure 6:
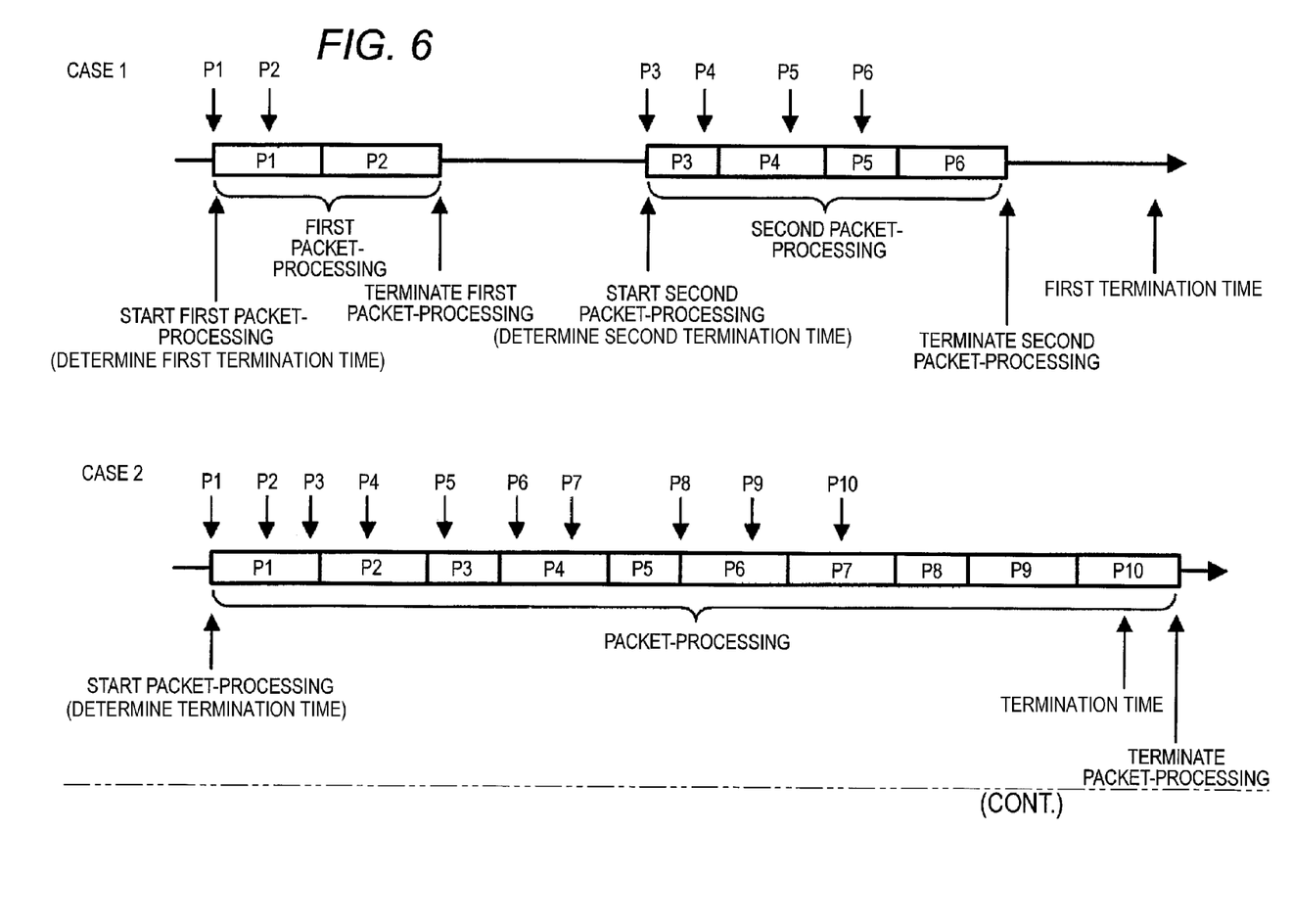
FIG. 6 is a view explaining packet-processing.

As shown in the Case 2 of FIG. 6, even when the termination time determined in step S74 of FIG. 5 has elapsed (YES in step S90 of FIG. 5) after processing the unprocessed packet P10, the sub CPU 24 does not causes the state of the main CPU 14 to transition into the non-sleep state when the unprocessed packet is not stored in the packet storage region 21 (NO in step S92 of FIG. 5). As a result, the time period during which the main CPU 14 is in the sleep state can be prolonged. After terminating the packet-processing, the sub CPU 24 can execute other process (e.g. the timer process).

Meanwhile, as shown in the Case 3 of FIG. 6, when the unprocessed packets P11 to P14 are stored in the packet storage region 21 (YES in step S92 of FIG. 5) after the termination time determined in step S74 of FIG. 5 elapsed (YES in step S90 of FIG. 5), the sub CPU 24 causes the state of the main CPU 14 to transition into the non-sleep state. Then, when transitioned to the non-sleep state, the main CPU 14 processes the unprocessed packets P11 to P14 (step S28 in FIG. 4). As a result, since continuous packet-processing time of the sub CPU 24 is not prolonged, the sub CPU 24 can be permitted to execute other processes. Further, since the main CPU 14 processes the unprocessed packets P11 to P14, the remaining unprocessed packets P11 to P14 can be processed quickly.

As shown in the Case 4 of FIG. 6, when the unprocessed packet P5 that is to be processed by the main CPU 14 remains in the packet storage region 21 (YES in step S84 of FIG. 5), the sub CPU 24 causes the state of the main CPU 14 to transition into the non-sleep state without executing a responding process to the unprocessed packet P5. Accordingly, the main CPU 14 can process the unprocessed packet P5 (step S28 in FIG. 4).

As shown in the Case 5 of FIG. 6, if the unused capacity of the packet storage region 21 is smaller than a predetermined capacity (NO in step S78 of FIG. 5), the sub CPU 24 terminates the packet-processing and causes the state of the main CPU 14 to transition into the non-sleep state. Further, the sub CPU changes the mode of the DRAM 22 from the self-refresh mode to the normal operation mode. When the DRAM 22 transitions into the normal operation mode, the main CPU 14 moves the unprocessed packets P5 to P15 stored in the packet storage region 21 to the DRAM 22. The DRAM 22 has capacity larger than the SRAM 20. As a result, it can be prevented that the received unprocessed packet cannot be stored in the packet storage region 21 because the unused capacity of the packet storage region 21 lacks. Further, when transited into the non-sleep state, the main CPU 14 processes the unprocessed packets P5 to P15, which were moved to the DRAM 22. The main CPU 14 has a processing speed higher than the sub CPU 24. Accordingly, in contrast to the case where the sub CPU 24 processes the unprocessed packets P5 to P15, the printer 10 can be performed faster.

Meanwhile, the PC 10 is an example of the communication apparatus, the main CPU 14 is an example of the first processing unit, the sub CPU 24 is an example of the second processing unit, and the packet storage region 21 is an example of the storage unit.

Modified Exemplary Embodiment (1) In one modified exemplary embodiment, the second unprocessed packet that can be processed by only the main CPU 14 may include a packet with a predetermined kind of protocol. The packet having the predetermined kind of protocol may be a packet requiring information (e.g. setting information of the printer 10) stored only in the DRAM 22, a packet (e.g. which corresponds to the print process) that can be processed by a program executed by only the main CPU, etc.

(2) During the packet-processing in the exemplary embodiment, when the unprocessed packet remains in the packet storage region 21 (YES in step S92 of FIG. 5) after the termination time determined in step S74 of FIG. 5 has elapsed (YES in step S90 of FIG. 5), the sub CPU 24 causes the state of the main CPU 14 to transition into the non-sleep state. On the other hand, when the unprocessed packet does not remain in the packet storage region 21 (NO in step S92 of FIG. 5) after the termination time determined in step S74 of FIG. 5 elapsed (YES in step S90 of FIG. 5), the sub CPU 24 does not cause the state of the main CPU 14 to transition into the non-sleep state. Instead of the embodiment, the sub CPU 24 may cause the state of the main CPU 14 to transition into the non-sleep state, even when the unprocessed packet remains in the packet storage region 21 after the termination time determined in step S74 of FIG. 5 elapsed (YES in step S90 of FIG. 5). That is, the sub CPU 24 may not execute the process of step S92 of FIG. 5. Generally, the second processing unit may cause the state of the first processing unit to transition from the sleep state to the non-sleep state without determining whether or not the unprocessed packet remains when the continuous packet-processing period exceeds the allowable time period.

(3) When starting the packet-processing in the exemplary embodiment, the sub CPU 24 determines the termination time of the packet-processing (step S72 in FIG. 5). Instead of the embodiment, when starting the packet-processing, the sub CPU 24 may operate the timer provided in the printer 10. In this case, the sub CPU 24 determines in step S90 of FIG. 5 whether or not the timer exceeds a predetermined measuring time. If the timer exceeds the predetermined measuring time, the process may proceed to step S92, and if the timer does not exceed the predetermined measuring time, the process may return to step S76.

(4) The sub CPU 24 may determine in step S78 of FIG. 5 whether or not the number of the unprocessed packets stored in the packet storage region 21 exceeds the predetermined number. In this case, if the number of the unprocessed packets exceeds the predetermined number, the sub CPU may terminate the packet-processing (i.e. NO in step S78 of FIG. 5). The sub CPU 24 may calculate the number of the unprocessed packets stored in the packet storage region 21 by counting the number of the unprocessed packets received during the packet-processing and subtracting the number of the packets completely processed during the packet-processing from the counted number of the unprocessed packets. The configuration of the modified exemplary embodiment (i.e. determining whether or not the number of the unprocessed packets exceeds the predetermined number) is an example of "determining whether or not the unused capacity of the storage unit lacks".

(5) The printer 10 may not include the SRAM 20. In this case, the DRAM 22 may be always maintained in the normal operation mode while the printer 10 is being turned ON. Further, the printer 10 may store the unprocessed packet received via the LAN 4 in the DRAM 22, even when the printer has any of the four states 42, 44, 46, and 48.

(6) According to the exemplary embodiment, when the main CPU 14 is changed from the sleep state to the non-sleep state, the main CPU 14 moves the unprocessed packet stored in the packet storage region 21 of the SRAM 20 to the DRAM 22 (step S50 in FIG. 4), and then processes the moved unprocessed packet. However, when the state of the main CPU transitions into the non-sleep state, the main CPU 14 may process the unprocessed packet as stored in the packet storage region 21 without moving the unprocessed packet to the DRAM 22. Since a processing speed of the main CPU 14 is higher than that of the sub CPU 24, capacity-lacking state of the packet storage region 21 can be resolved quickly.

(7) The exemplary embodiments have been described with regard to the printer 10, the present invention is applicable to communication apparatuses such as servers, scanners, multi-function devices, and the like.

Further, the technical materials described in the specification or drawings have a technical effect in independent or combined forms, thus the technical components are not limited to the combination described in claims when the application was filed. Further, the technology described in the specification or the drawings may simultaneously achieve one or more purposes.

What is claimed is:

1. A communication apparatus that is to be connected to a network, the communication apparatus comprising:
    a first processing unit configured to transition between a sleep state and a non-sleep state and configured to process a packet received via the network when the first processing unit is in the non-sleep state; and
    a second processing unit configured to process a packet received via the network when the first processing unit is in the sleep state,
    wherein the second processing unit is capable of executing packet-processing for sequentially processing one or more unprocessed packets,
    wherein the second processing unit includes a detecting section that detects a reception of an unprocessed packet,
    wherein, when the first processing unit is in the sleep state and the reception of the unprocessed packet is detected, the second processing unit starts the packet-processing, and
    wherein, even when an unprocessed packet still remains, the second processing unit terminates the packet-processing if a continuous time period of the packet-processing exceeds an allowable time period.

2. The communication apparatus according to claim 1, wherein, when the continuous time period of the packet-processing exceeds the allowable time period, the second processing unit causes the first processing unit to transition from the sleep state to the non-sleep state.

3. The communication apparatus according to claim 1,
wherein, when the continuous time period of the packet-processing exceeds the allowable time period, the second processing unit further determines whether or not an unprocessed packet remains,
and when it is determined as a first case that the unprocessed packet remains, the second processing unit causes a state of the first processing unit to transition from the sleep state to the non-sleep state, and
when it is determined as a second case that the unprocessed packet does not remain, the second processing unit does not cause the state of the first processing unit to transition from the sleep state to the non-sleep state.

4. The communication apparatus according to claim 3,
wherein, when it is determined as the first case that the unprocessed packet remains, the first processing unit processes the remaining unprocessed packet after the transition into the non-sleep state.

5. The communication apparatus according to claim 1,
wherein the second processing unit determines a termination time of the packet-processing based on the allowable time period, and
wherein, if current time is past the termination time, the second processing unit determines that the continuous time period of the packet-processing exceeds the allowable time period.

6. The communication apparatus according to claim 1,
wherein the processing for the unprocessed packet includes executing a responding process for responding to a transmission source of the unprocessed packet.

7. The communication apparatus according to claim 1,
wherein, before the continuous time period of the packet-processing exceeds the allowable time period, the second processing unit determines whether or not an unprocessed packet remains each time the processing for each of the unprocessed packets is terminated,
and when it is determined that the unprocessed packet does not remain, the second processing unit terminates the packet-processing before the continuous time period of the packet-processing exceeds the allowable time period.

8. The communication apparatus according to claim 1,
wherein, before the continuous time period of the packet-processing exceeds the allowable time period, the second processing unit determines whether or not a specific kind of unprocessed packet that is to be processed by the first processing unit remains, and
when it is determined that the specific kind of unprocessed packet that remains, the second processing unit terminates the packet-processing and causes the first processing unit to transition from the sleep state to the non-sleep state before the continuous time period of the packet-processing exceeds the allowable time period.

9. The communication apparatus according to claim 1, further comprising:
a storage unit configured to store the unprocessed packet,
wherein, before the continuous time period of the packet-processing exceeds the allowable time period, the second processing unit determines whether or not there is a shortage of unused capacity of the storage unit, and
when it is determined that there is the shortage of unused capacity of the storage unit, the second processing unit terminates the packet-processing and causes the first processing unit to transition from the sleep state to the non-sleep state, before the continuous time period of the packet-processing exceeds the allowable time period.

\* \* \* \* \*